May 3, 1960
E. E. LINTZ ET AL
2,934,874
AGRICULTURAL VEHICLE
Filed Jan. 8, 1958
2 Sheets-Sheet 1
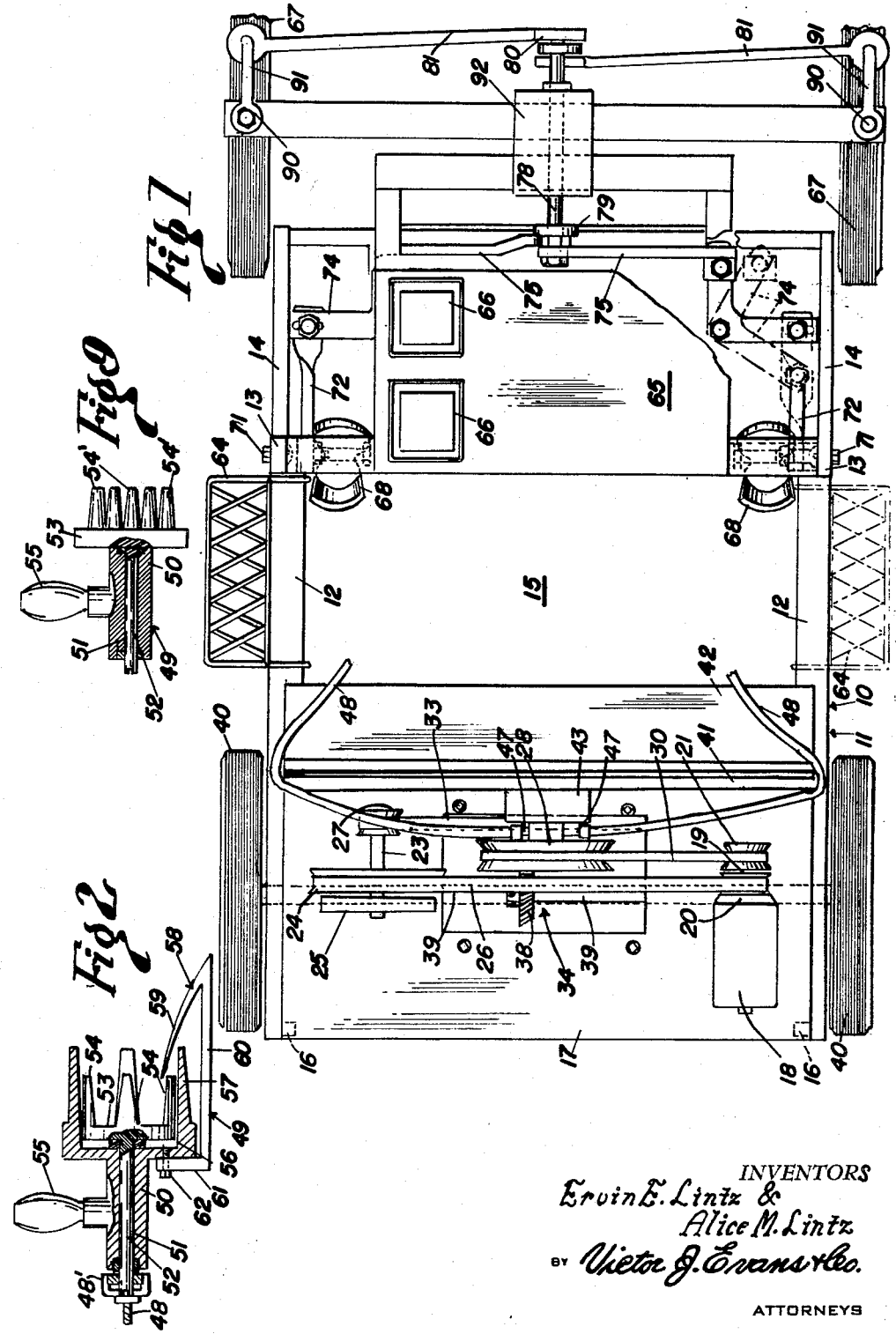
INVENTORS
Ervin E. Lintz &
Alice M. Lintz
BY Victor J. Evans & Co.
ATTORNEYS May 3, 1960  E. E. LINTZ ET AL  2,934,874
AGRICULTURAL VEHICLE
Filed Jan. 8, 1958  2 Sheets-Sheet 2
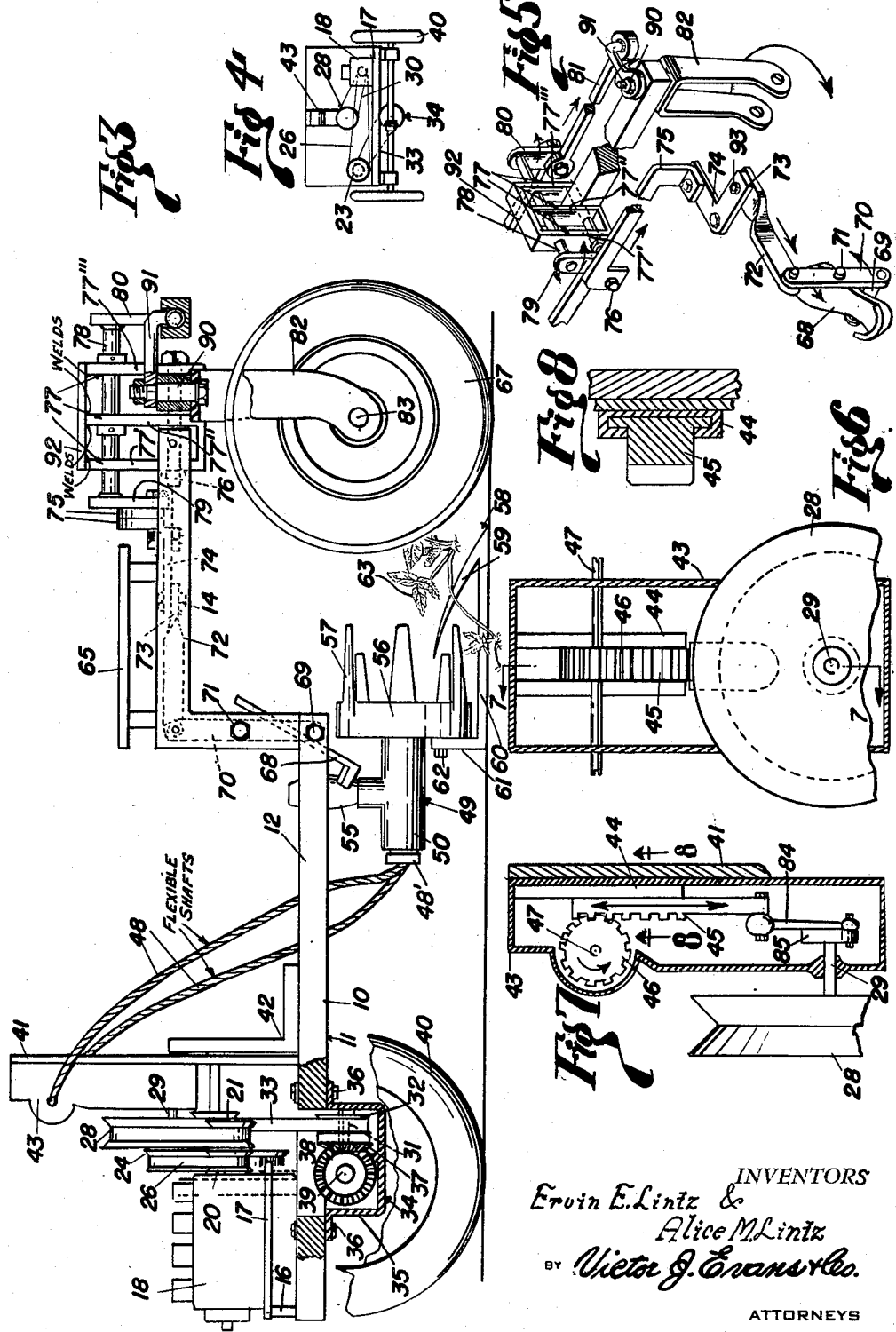
INVENTORS
Ervin E. Lintz &
Alice M. Lintz
BY Victor J. Evans & Co.
ATTORNEYS

United States Patent Office 2,934,874
Patented May 3, 1960

2,934,874
AGRICULTURAL VEHICLE

Ervin E. Lintz and Alice M. Lintz, Millington, Mich.

Application January 8, 1958, Serial No. 707,696

1 Claim. (Cl. 56—25)

This invention relates to agricultural equipment, and more particularly to a vehicle for use in performing various work of an agricultural nature.

The object of the invention is to provide a vehicle which is self propelled, and wherein the vehicle is constructed so that the user can conveniently perform various tasks around a farm or other localities.

Another object of the invention is to provide an agricultural vehicle which is provided with an engine whereby the vehicle can be propelled along as desired, and wherein there is further provided a cutting mechanism so that various weeds or plants can be conveniently cut or harvested, and wherein a means is provided for supporting baskets or containers which are to be filled with the material that is being harvested, there being means which is operated by the user's feet for steering the vehicle so that the user's hands will be free to operate the cutting mechanism or perform other jobs.

A further object of the invention is to provide an agricultural vehicle which is extremely simple and inexpensive to manufacture.

Other objects and advantages will be apparent during the course of the following description.

In the accompanying drawings forming a part of this application, and in which like numerals are used to designate like parts throughout the same.

Figure 1 is a plan view illustrating the agricultural vehicle of the present invention.

Figure 2 is a sectional view illustrating the cutting mechanism.

Figure 3 is a side elevational view of the vehicle, with parts broken away and in section.

Figure 4 is a rear elevational view on a reduced scale of the vehicle, and showing the drive mechanism.

Figure 5 is a fragmentary perspective view on a reduced scale illustrating the steering mechanism.

Figure 6 is a fragmentary sectional view on an enlarged scale illustrating the means for operating the cutting mechanism.

Figure 7 is a view taken at right angles to the view shown in Figure 6 and taken on the line 7—7 of Figure 6.

Figure 8 is a sectional view on an enlarged scale taken on the line 8—8 of Figure 7.

Figure 9 is a sectional view illustrating certain details of the cutter mechanism.

Referring in detail to the drawings, the numeral 10 indicates the agricultural vehicle of the present invention, and the vehicle 10 includes a frame or chassis 11 which embodies a pair of spaced parallel horizontally disposed beams 12. Extending upwardly from the front ends of the beams 12 and secured thereto are vertically disposed posts 13. Horizontally disposed bars 14 extend forwardly from the frame, and the frame is shaped so that there is provided an open space 15 between the front ends of the beams 12, whereby this open space 15 can be used to provide clearance for operating a cutting mechanism as later described in this application.

Extending upwardly from the rear ends of the beams 12 and secured thereto is a support member 16 which serves to support a horizontally disposed base 17, and a conventional engine 18 which may be gas operated is supported on the base 17.

Extending forwardly from the engine 18 and driven thereby is a first shaft 19 which has a pair of pulleys 20 and 21 thereon, Figure 2. A second shaft 23 is spaced from the first shaft 19, and the shaft 23 has pulleys 24 and 27 thereon, and a flywheel 25 may also be connected to the shaft 23. An endless belt 26 is trained over the pulleys 20 and 24. The numeral 28 indicates a pulley which is connected to a shaft 29, and an endless belt 30 is trained over the pulley 28 and over the pulley 21 so that as the shaft 19 is driven by the engine 18, the shafts 23 and 29 will likewise be rotated.

As shown in the drawings, there is further provided a shaft 31 which forms a part of a differential 34 which is mounted below the rear portion of the frame, and the shaft 31 has a pulley 32 thereon, there being an endless belt 33 trained over the pulley 32 and over the pulley 27. The differential 34 includes a casing or housing 35 that may be secured in place by suitable securing elements such as the bolts 36, and a gear member 37 is mounted on the shaft 31, the gear member 37 meshing with gears 38 which are connected to the rear axle 39. The numeral 40 indicates traction wheels which are connected to the outer ends of the axle 39.

Extending upwardly from the beams 12 and secured thereto is a vertically disposed panel 41, and the numeral 42 indicates a seat which may also be supported by the beams 12. The seat 42 may be adjustably mounted. Secured to the upper rear portion of the panel 41 is a housing 43, and fixedly mounted in the housing 43 is a guide member 44. The numeral 45 indicates a toothed rack which is slidably supported by the guide member 44, and a gear wheel 46 which is capable of oscillations, has its teeth meshing with the teeth of the rack 45, Figure 7. A rod 47 extends through the oscillating gear 46, and the cables 48 are connected to the ends of the rods 47 whereby the cables 48 can be used for operating a cutting mechanism which is indicated generally by the numeral 49. There is further provided a union or bushing 48' which permits the cables to function properly. The cables 48 are in the nature of flexible shafts.

As shown in Figure 2, the cutting mechanism 49 includes a hub 50 which is provided with a central longitudinally extending bore 51 that has a shank or shaft 52 rotatably supported therein. The head 53 is secured to the front end of the shank 52, and a plurality of blades 54 extend forwardly from the head 53, and the blades 54 may have sharp cutting edges. A handle 55 is secured to the hub 50, and the handle 55 is adapted to be gripped in the person's hand as the person is seated on the seat 42, and the space 15 provides sufficient clearance whereby plants or weeds such as the weeds 63 may be cut. The cutting mechanism 49 further includes a guard 56 which is secured to the front end of the hub 50, and the guard 56 includes a collar portion 57. The numeral 58 indicates a body member which can be used to guide the plant 53 into the path of the cutting mechanism, and the body member 58 can also be used for moving stones out of the path of the cutting mechanism so as to prevent damage thereto. The body member 58 includes a first portion 59, a second portion 60, and a third portion 61 which may be secured in place by a suitable securing element 62.

The numeral 64 indicates racks or trays which can be detachably connected to the frame, and the racks 64 can be used for holding containers or baskets such as containers which are to be filled with strawberries that are being picked. The vehicle of the present invention further includes a horizontally disposed platform 65 which may be used for supporting other containers or baskets 66, Figure 1.

The numeral 67 indicates front wheels, and the wheels 67 are adapted to be turned or steered by means of foot pedals 68. This construction provides a means whereby the operator of the vehicle can steer the vehicle by foot pressure so that the hands are free to perform various cutting operations or the like. The steering mechanism includes the foot pedals 68 which are connected to arms 70 by means of pins 69, Figure 5, and the arms 70 are pivotally connected to the posts 13 by means of pivot pins 71. Links 72 extend forwardly from the upper ends of the arms 70, and the links 72 are connected to end portions 73 of movable yokes 74. Straps 75 are connected to the yokes 74, and a pin 76 is connected to the straps 75, the pin 76 extending through plates 77. A pin 78 is connected to the plates 77, and the pin 78 is connected to a bell crank 79 which in turn is connected to the straps 75. A bell crank 80 connects the pin 78 to cross pieces 81, there being brackets 82 operatively connected to the cross pieces 81. The numeral 83 indicates pins or axles which serve to connect the front wheels 67 to the brackets 82. Thus, by applying foot pressure to the foot pedals 68, the pair of front wheels 67 can be turned whereby the vehicle can be steered without the necessity of using the hands. The brackets 82 have pins 90 connected to their upper ends, and end pieces 91 connect the cross pieces 81 to the pins 90.

With further attention to the set of plates 77, the two rear plates 77' and 77" are welded to the front frame member, and the front plate 77''' is welded or connected to the rear two plates by means of a top member 92 which extends across the tops of the plates to allow the front axle to swing up or down. The pins or bolts 93 serve as a fulcrum or connection between the members 72 and 74, and wherein the back and forth motion of the foot pedals will be able to provide a steering effect or motion for the wheels 67.

In Figure 9 there is shown a slightly modified cutting mechanism wherein the blades are indicated by the numeral 54', and the blades 54' can be used for certain types of weeding or cutting operations.

As shown in Figure 7, a crank 84 is connected to the sliding rack 45, and the crank 84 is connected to an eccentric 85 which is operatively connected to the shaft 29 and this arrangement causes the rack 45 to move up and down as the shaft 29 is rotated.

From the foregoing, it is apparent that there has been provided an agricultural vehicle which can be used for a multiplicity of different purposes around a farm or the like. In use, the driver or operator of the vehicle sits on the seat 42, and the space 15 which is open, provides sufficient clearance so that the user can grip the handle 55 of the cutting mechanism 49. Then, with the engine 18 actuated, the vehicle can be driven along the ground, and at the same time, the cutting mechanism 49 can be operated. The means for propelling the vehicle along the ground includes the shaft 19 which is driven by the engine 18, and this rotation of the shaft 19 causes rotation of the pair of pulleys 20 and 21. This in turn causes movement of the endless belt 26 which in turn rotates the pulley 24 and shaft 23 and also turns the pulley 27 which in turn moves the belt 33. The belt 33 is trained over the pulley 32 which is on the shaft 31 in the differential 34 and this causes the bevel gear 37 to rotate the bevel gear 38 which in turn rotates the rear axle 39. Since the rear wheels 40 are connected to the axle 39, it will be seen that this construction permits the vehicle to be driven along the ground so that wide areas can be conveniently harvested or weeded.

At the same time, the engine 18 provides power for operating the cutting mechanism 49. Thus, as the pulley 21 rotates, it moves the belt 30 which is trained over the pulley 28, so that the shaft 29 will be rotated. As the shaft 29 is rotated, it moves the eccentric 85 which in turn is connected to crank 84 and this results in up and down travel of the rack 45 in the guide member 44, Figure 7. Since the teeth of the gear 46 mesh with the teeth of the rack 45, it will be seen that this up and down movement of the rack 45 will result in oscillation of the gear 46, and since the rod 47 is connected to the gear 46, it will be seen that the rod 47 will also be rotated or oscillated back and forth. The pair of cables 48 are connected to the ends of the rod 47, and the cables 48 are also operatively connected to the rear end of the shank 52 through the medium of the union 48', so that this oscillation of the rod 47 will be transmitted through the cables 48 to cause oscillation of the shank 52. The members 48 are in the nature of flexible shafts so as to permit the necessary movement to take place. As the shank 52 turns back and forth, it moves the cutting blades 54 with respect to the stationary member 57 so that weeds or plants 63 which are directed into the path of these cutting blades will be cut off at the desired length. The handle 55 can be conveniently gripped by the person on the seat 42 whereby the cutting mechanism 49 can be held at the desired height or position.

With the driver of the vehicle on the seat 42, the feet can be applied to the foot pedal 68, so that by applying foot pressure to the pedal 68, the members 70 through 82 can be moved and this movement in turn is transmitted through the previously described mechanism to rotate or turn the front wheels 67 whereby the vehicle can be readily steered with the feet. The platform 65 can be used for supporting containers 66, and the racks 64 can also be used for supporting suitable containers.

The parts can be made of any suitable material and in different shapes or sizes.

The cutting mechanism 49 can be used in weeding operations as well as in harvesting various types of growing crops. The racks 64 can be used for supporting boxes or containers, as for example, when said boxes are being used for picking strawberries or the like. Suitable bearings, and supports and braces can be used wherever desired or required. The member 58 can serve as a guard so as to prevent stones, rocks or the like from damaging the cutting mechanism. The cutting mechanism 49 is constructed so that it can be used safely and easily by the operator. The member 58 is also shaped so that it can be used for lifting plants which lie in a low down position whereby such plants can be readily cut off by the oscillating blades 54 or 54'. This oscillation of the blades prevents runners or vines from becoming tangled in the cutter.

The machine of the present invention is especially suitable for use in picking strawberries and the like and for use in weeding and cutting runners. It will not be necessary for a person to stoop when picking, since the user is in a sitting position and is low down within easy picking range. The machine is steered with the feet so that both hands are free for picking, and berry boxes are handy to the user. The racks can be removed and empty cases or full boxes or cases can be supported on the platform 65. Thus, picking will be speeded up and will be facilitated.

When the machine is being used for weeding, it will propel itself with an easy reach to the work area, and the ground can be weeded and cultivated in and around small plants. The machine is fast in operation and easily controlled and the machine can also be used for cutting runners, such as runners from strawberry plants. Thus, it can be used for trimming the runners of strawberries quickly and thoroughly, and oscillating cutter blades will not become entangled with weeds or small plants, and also small plants will not be accidentally pulled up. Also, both sides of strawberry hills or rows can be worked at one operation.

The above description of the invention is for illustrative purposes only and it is understood that modifications may be made in the construction within the scope and spirit of the following claim.

We claim:

An agricultural vehicle comprising a frame embodying a pair of horizontally disposed spaced parallel beams, said beams having an open space therebetween, a horizontally disposed base supported on the rear portion of said beams, an engine supported on said base, ground engaging wheels driven by said engine, a seat supported by said beams, a cutting mechanism operatively connected to said engine and said cutting mechanism being contiguous to the open space between said beams, said cutting mechanism including a hub portion, a handle mounted on said hub portion and adapted to be gripped in a person's hand as the person is seated on the seat, a plurality of forwardly extending blades rotatably mounted in said hub portion, a guard integral with said hub portion, and a body member providing a guide which is mounted on said guard, a vertically disposed panel extending upwardly from said beams, and control means for the cutting mechanism supported by said panel.

References Cited in the file of this patent

UNITED STATES PATENTS

| | | |
|---|---|---|
| 2,583,358 | Cesan | Jan. 22, 1952 |
| 2,589,845 | Mott | Mar. 18, 1952 |
| 2,590,785 | Nealy | Mar. 25, 1952 |
| 2,795,815 | Dahlberg | June 18, 1957 |
| 2,805,537 | Sturgis | Sept. 10, 1957 |